United States Patent
Kanade et al.

(10) Patent No.: US 7,102,666 B2
(45) Date of Patent: Sep. 5, 2006

(54) SYSTEM AND METHOD FOR STABILIZING ROTATIONAL IMAGES

(75) Inventors: Takeo Kanade, Pittsburgh, PA (US); Robert Collins, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 869 days.

(21) Appl. No.: 10/074,315

(22) Filed: Feb. 12, 2002

(65) Prior Publication Data

US 2002/0118969 A1  Aug. 29, 2002

Related U.S. Application Data

(60) Provisional application No. 60/268,205, filed on Feb. 12, 2001, provisional application No. 60/268,206, filed on Feb. 12, 2001.

(51) Int. Cl.
*H04N 7/18* (2006.01)

(52) U.S. Cl. .................... 348/159; 348/142; 348/169; 348/143; 348/154; 348/155; 348/153; 348/39; 382/103; 382/154

(58) Field of Classification Search ............. 348/36, 348/39, 46–48, 135, 139, 142, 143, 152–159, 348/169–172; 382/103, 154
See application file for complete search history.

(56) References Cited

U.S. PATENT DOCUMENTS

| | | | |
|---|---|---|---|
| 5,164,827 A | 11/1992 | Paff | |
| 5,489,886 A * | 2/1996 | Wexler et al. | 340/323 R |
| 5,714,997 A * | 2/1998 | Anderson | 348/39 |
| 5,912,700 A | 6/1999 | Honey et al. | |
| 5,917,937 A | 6/1999 | Szeliski et al. | |
| 6,005,610 A | 12/1999 | Pingali | |
| 6,084,979 A | 7/2000 | Kanade et al. | |
| 6,094,198 A | 7/2000 | Shashua | |
| 6,100,925 A | 8/2000 | Rosser et al. | |
| 6,133,946 A * | 10/2000 | Cavallaro et al. | 348/135 |
| 6,137,491 A | 10/2000 | Szeliski | |
| 6,157,747 A * | 12/2000 | Szeliski et al. | 382/284 |
| 6,259,853 B1 | 7/2001 | Chen et al. | |
| 6,608,923 B1 | 8/2003 | Zhang et al. | |

(Continued)

FOREIGN PATENT DOCUMENTS

EP  0 529 317 A1  3/1993

(Continued)

OTHER PUBLICATIONS

Spice, Byron: "CMU experts helping CBS's 30 robotic cameras to work as one", Pittsburgh Post-Gazette, Jan. 24, 2001, Pittsburgh, PA, USA.

(Continued)

*Primary Examiner*—Shawn S. An
(74) *Attorney, Agent, or Firm*—Kirkpatrick & Lockhart Nicholson Graham LLP

(57) ABSTRACT

A method and a system of generating an image sequence of an object within a scene. According to one embodiment, the method includes capturing an image (images $I_{1-N}$) of the object with a plurality of camera systems, wherein the camera systems are positioned around the scene. Next, the method includes 2D projective transforming certain of the images ($I_{2-N}$) such that a point of interest in each of the images is at a same position as a point of interest in a first image ($I_1$) from one of the camera systems. The method further includes outputting the transformed images ($I_{2'-N'}$) and the first image ($I_1$) in a sequence corresponding to a positioning of the corresponding camera systems around the scene.

19 Claims, 8 Drawing Sheets

U.S. PATENT DOCUMENTS

| | | | |
|---|---|---|---|
| 6,674,461 B1 * | 1/2004 | Klapman | 348/42 |
| 7,027,083 B1 * | 4/2006 | Kanade et al. | 348/159 |
| 2001/0028399 A1 * | 10/2001 | Conley | 348/239 |
| 2001/0052131 A1 | 12/2001 | Hobson et al. | |
| 2002/0030741 A1 | 3/2002 | Broemmelsiek | |
| 2002/0118286 A1 | 8/2002 | Kanade et al. | |
| 2002/0145660 A1 | 10/2002 | Kanade et al. | |
| 2003/0076413 A1 | 4/2003 | Kanade et al. | |
| 2003/0210329 A1 | 11/2003 | Aagaard et al. | |

FOREIGN PATENT DOCUMENTS

| | | |
|---|---|---|
| WO | WO 99 52288 A | 10/1999 |
| WO | WO 02/11431 A1 | 2/2002 |
| WO | WO 02 087218 A | 10/2002 |
| WO | WO 02 096096 A | 11/2002 |

OTHER PUBLICATIONS

Grotticelli, Michael: "CBS Sports eyes Final Four", Broadcasting & Cable, No. 13, Mar. 26, 2001, North Hollywood, CA, USA. (www.broadcastingcable.com/index.asp?layout=print_page&articleID=CA67817).

Saito, H., et al.: "Appearance-Based Virtual View Generation of Temporally-Varying Events from Multi-Camera Images in the 3D Room", 3-D Digital Imaging & Modeling, 1999 Proceedings. Second International Conference in Ottawa, Ont., Canada. Oct. 4-8, 1999, Los Alamitos, CA, USA. IEEE Comput. Soc, US. Oct. 4, 1999 pp. 516-525.

Kanade, T. et al.: "Virtualized Reality: Constructing Virtual Worlds From Real Scenes" IEEE Multimedia, Jan.—Mar. 1997, IEEE, USA, vol. 4, No. 1, pp. 34-47.

Narayanan, PJ et al.: "Constructing Virtual Worlds Using Dense Stereo" 6$^{th}$ International Conference On Computer Vision. ICCV '98. Bombay, Jan. 4-7, 1998, pp. 3-10.

Tsai R Y: "A Versatile Camera Calibration Technique For High-Accuracy 3D Machine Vision Metrology Using Off-The-Shelf TV Cameras and Lenses," IEEE Journal of Robotics and Automation, IEEE Inc. New York, US, vol. RA-3, No. 4, Aug. 1987, pp. 323-344.

Vedula S et al.: "Modeling, combining and rendering dynamic real-world events from image sequences," VSMM98. 4$^{th}$ International Conference On Virtual Systems and Multimedia, 1998 pp. 326-332.

* cited by examiner

SYSTEM AND METHOD FOR STABILIZING ROTATIONAL IMAGES

CROSS-REFERENCE TO RELATED APPLICATIONS

This application claims priority under 35 U.S.C. § 119 to U.S. provisional patent application Ser. Nos. 60/268,205 and 60/268,206, both filed Feb. 12, 2001, which are incorporated herein by reference.

BACKGROUND OF THE INVENTION

1. Field of the Invention

The present invention relates generally to image and video processing.

2. Description of the Background

With reference to FIG. 1, the so-called "spin-image" effect may be achieved by using multiple cameras with pan/tilt/zoom control mounted around an area of interest. The cameras are controlled to fixate on points within the area of interest. Playing back sequentially one frame from each camera taken at the same instant in time results in the frozen-time, spin-image effect. This is sometimes referred to as the "3D stop-motion image" effect. However, if control of the cameras is not perfect, they will not all fixate precisely on one three-dimensional (3d) scene point, as illustrated in FIG. 2. The result is a "jumpiness" in the image sequence that detracts from the spin-image effect.

BRIEF SUMMARY OF THE INVENTION

In one general respect, the present invention is directed a method of generating an image sequence of an object within a scene. According to one embodiment, the method includes capturing an image (images $I_{1-N}$) of the object with a plurality of camera systems positioned around the scene. Next, the method includes performing a 2D projective transformation on certain of the images ($I_{2-N}$) such that a point of interest in each of the images is at a same position as a point of interest in a first image ($I_1$) from one of the camera systems. It should be noted that the first image need not be the first image in terms of time, but rather may be any image from the images captured by the plurality of camera systems. The method further includes outputting the transformed images ($I_{2'-N'}$) and the first image ($I_1$) in a sequence corresponding to a positioning of the corresponding camera systems around the scene. According to one embodiment, the size of the object in each captured image may be substantially the same.

In another general respect, the present invention is directed to a system for generating an image sequence of an object within a scene. According to one embodiment, the system includes means for storing images of the object from a first camera system (image $I_1$) and a plurality of camera systems (images $I_{2-N}$), wherein the first camera system and the plurality of camera systems are positioned around the scene. The system further includes a frame-sequencing module for performing a 2D projective transformation on the images from the plurality of camera systems ($I_{2'-N'}$) such that a point of interest in each of the images from the plurality of camera systems is at a same position as a point of interest in the first image ($I_1$). Again, the first image $I_1$ need not be the image that is captured first in terms of time, but rather may be any image from the plurality of camera systems.

DESCRIPTION OF THE FIGURES

Embodiments of the present invention are described in conjunction with the following figures, wherein.

DETAILED DESCRIPTION OF THE INVENTION

It is to be understood that the figures and descriptions of the following embodiments have been simplified to illustrate elements that are relevant for a clear understanding of the present invention, while eliminating, for purposes of clarity, other elements. For example, certain operating system details and modules of computer processing devices are not described herein. Those of ordinary skill in the art will recognize, however, that these and other elements may be desirable in a typical image processing system. However, because such elements are well known in the art, and because they do not facilitate a better understanding of the present invention, a discussion of such elements is not provided herein.

Figure 1:
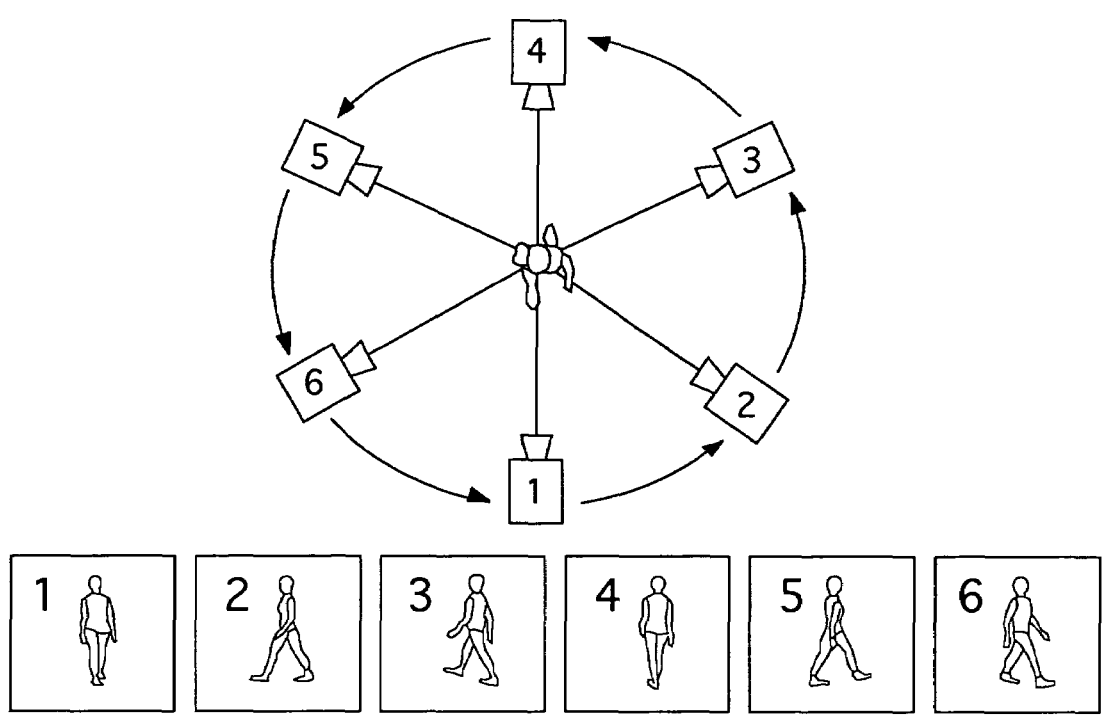
FIG. 1 is a diagram illustrating a technique for achieving the so-called "3D stop-motion" or "spin image" effect.
Figure 2:
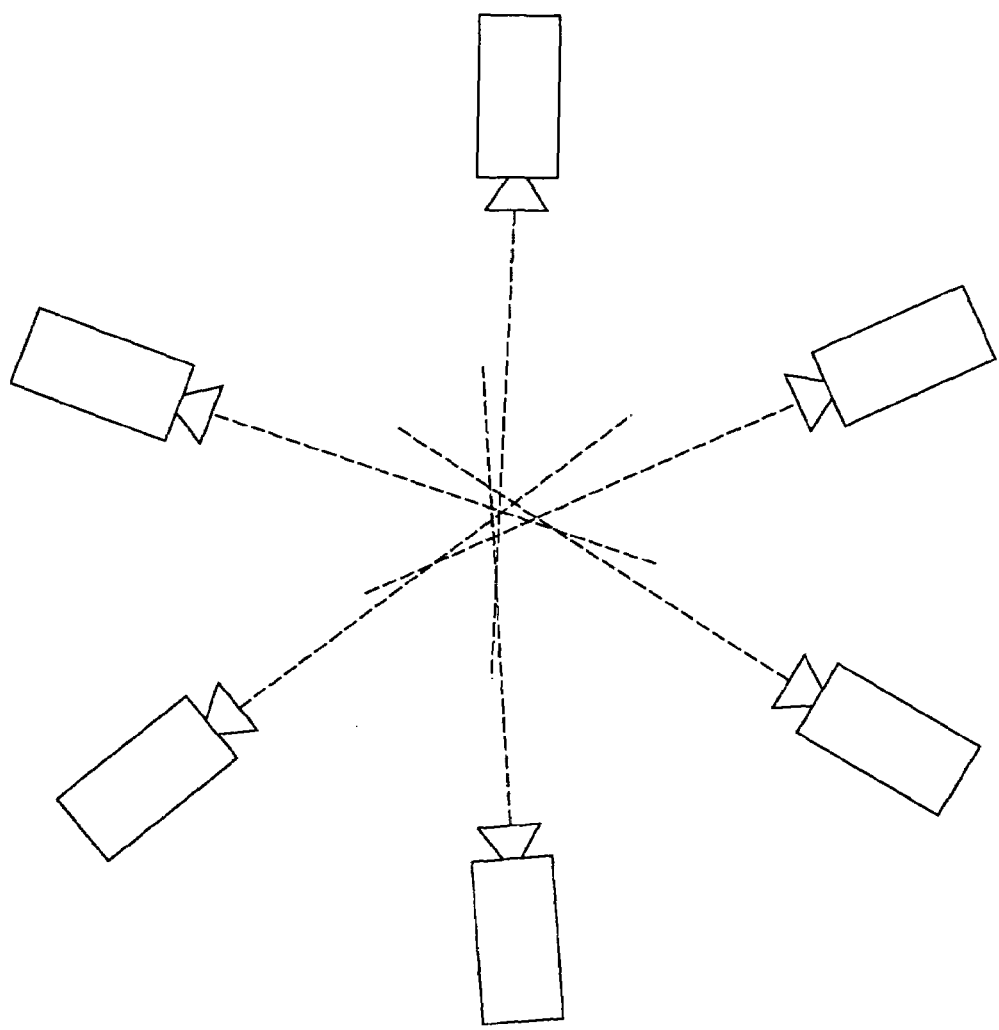
FIG. 2 is a diagram illustrating potential misalignment of the cameras for the technique of FIG. 1.
Figure 3:
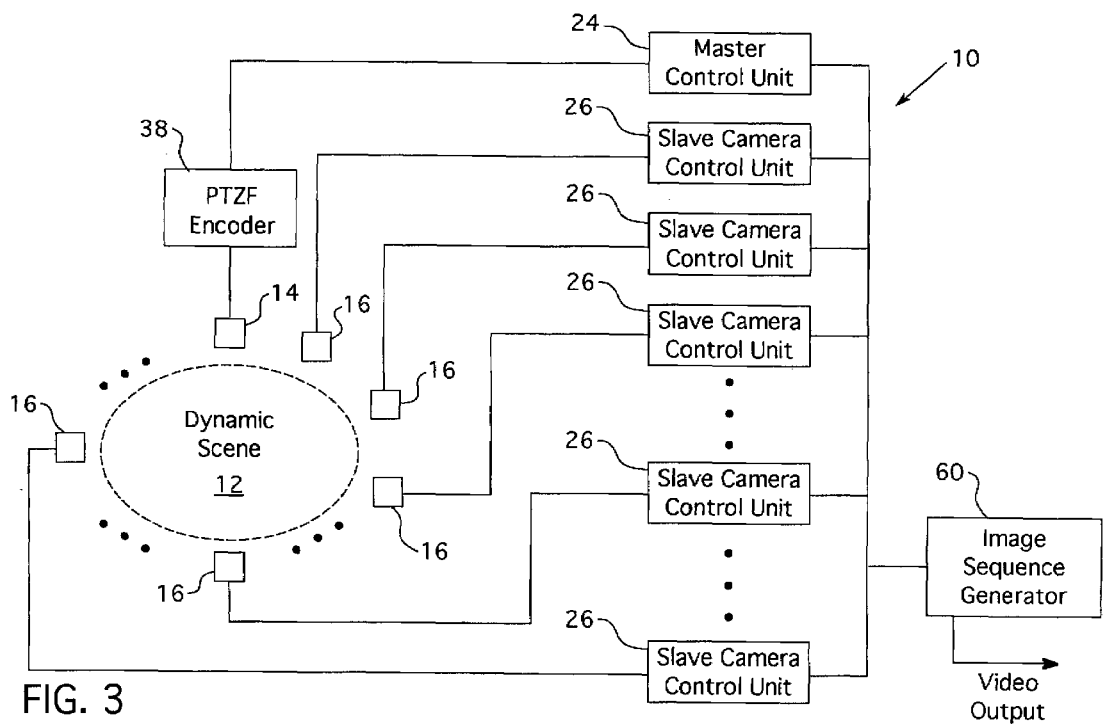
FIGS. 3 and 4 are block diagrams of the system of the present invention according to one embodiment.
Figure 4:
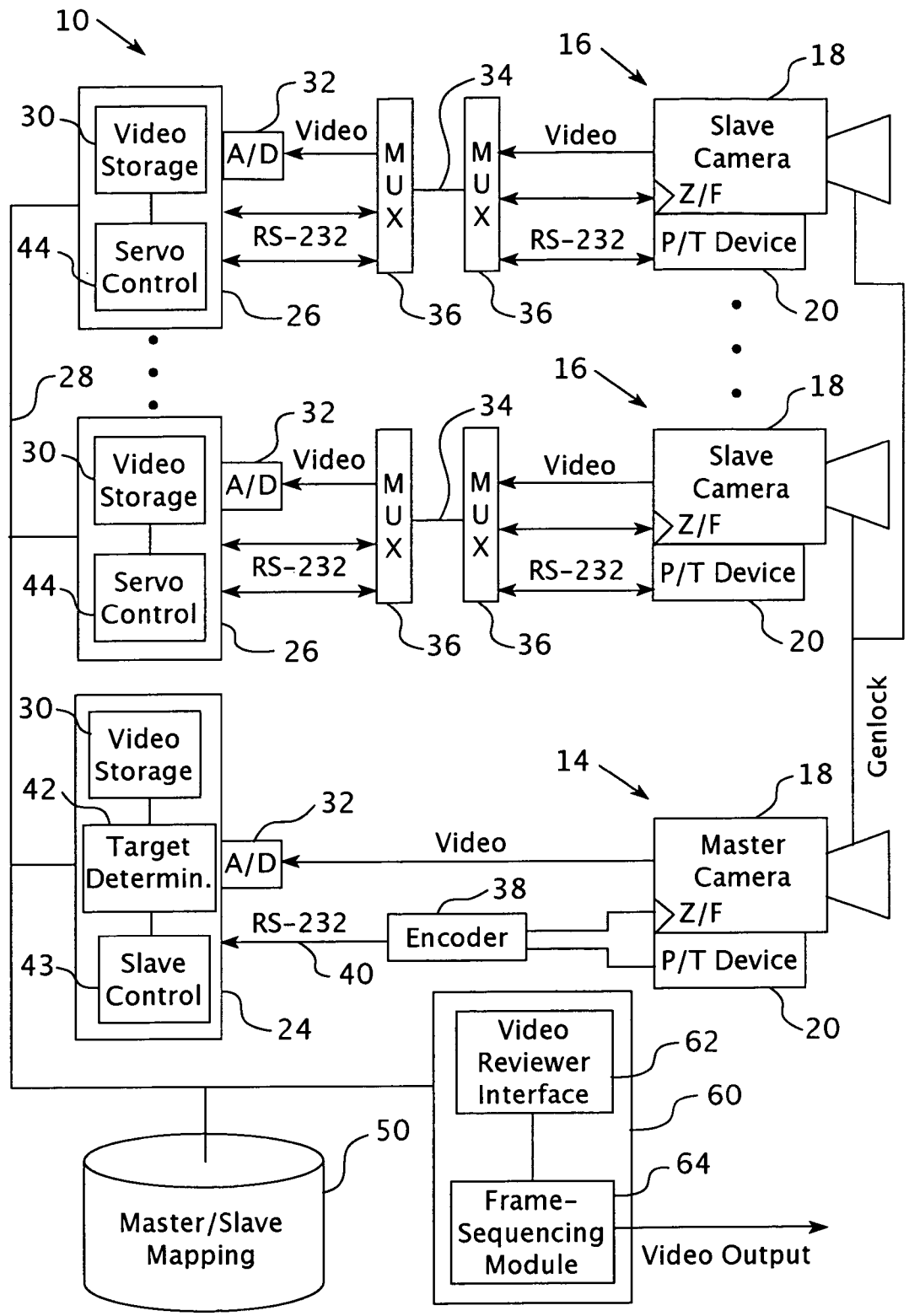

According to one embodiment, the present invention is directed to a system for serving on a moving target within a dynamic scene. FIGS. 3 and 4 are block diagrams of the system 10 according to one embodiment. The system 10 includes a number of variable pointing camera systems positioned around the dynamic scene 12. The camera systems include a master variable pointing camera system 14 and a number of slave variable pointing camera systems 16. According to one embodiment, the variable pointing camera systems 14, 16 may be, for example, pan/tilt camera systems, as explained further herein. For purposes of convenience, the camera systems 14, 16 are referred to hereinafter as "pan/tilt" camera systems, although it should be recognized that the variable pointing camera systems 14, 16 may be any camera system having the ability to point at different targets within the scene 12.

The master pan/tilt camera system 14 may include a video camera 18 and a pan/tilt device 20 for panning and tilting the camera 18. Similarly, the slave pan/tilt camera systems 16 may include a video camera 18 and pan/tilt devices 20. The system 10 may include any number of camera systems 14, 16 positioned around the scene, and the quantity may be determined upon the system requirements and applications. According to one embodiment, the camera systems 14, 16 are equally spaced about the scene 12.

As illustrated in FIGS. 3 and 4, the system 10 additionally includes a master control unit 24 in communication with the master camera system 14. The system 10 also includes a number of slave camera control units 26 in communication with the master control unit 24 by, for example, a computer network 28 such as, for example, a LAN. Each slave camera control unit 26 is for controlling one or more slave camera systems 16. For purposes of simplicity, in FIGS. 3 and 4 each slave camera control unit 26 is shown as being in communication with only one slave camera system 16; however, according to other embodiments, more than one slave camera system 16 may be in communication with one slave camera control unit 26 for the purpose of having that one slave camera control unit 26 control multiple slave camera systems 16.

The master control unit 24 and the slave camera control units 26 may be implemented as computing devices such as, for example, a personal computer, a laptop computer, a workstation, a minicomputer, a mainframe or a supercomputer, depending upon the application requirements. Each of the control units 24, 26 may include a video storage unit 30 for storing digitized, time-stamped video image frames from the respective camera systems 14, 16. The video storage units 30 may be such that the video image frames are retrievable both spatially (by camera) and/or temporally (by time). According to one embodiment, the video storage units 30 maybe, for example, DAT drives utilizing a Digital Video Data Storage (DVDS) format. For an embodiment where the cameras 18 are not digital video cameras, the system 10 may include analog-to-digital (A/D) converters 32 to convert the analog video from the cameras 18 to a digital format.

The camera systems need not be in close proximity to their respective control units. For example, in FIG. 4 the slave camera systems 16 are shown as being in communication with their respective slave camera control units 26 via a fiber optic cable 34. For such an embodiment, the system 10 may include multiplexers/demultiplexers (MUX) 36 to multiplex and demultiplex the data onto and off of the fiber optic cables 34. In FIG. 4 the master camera system 14 is not illustrated as being in communication with the master control unit via a fiber optic cable, but according to other embodiments these components may be in communication via, for example, a fiber optic cable.

The master camera system 14 may be operated by an operator (not shown), which may be, for example, a human operator or a computer vision system, as described hereinafter. Accordingly, the operator may focus the master camera system 14 on the point of interest (or target) within the scene 12. Parameters of the master camera system 14 are communicated to the master control unit 24. According to one embodiment, the relevant parameters may include pointing parameters, such as pan (P) and tilt (T) angles for the pan/tilt devices 20, optical parameters, such as zoom (Z) and focus (F) parameters for the cameras 18, and mechanical parameters, such as speed and accuracy. These parameters may be digitally encoded by an encoder 38 and communicated to the master control unit 24, such as by using a RS232 link 40. For purposes of convenience for the description to follow, the relevant parameters are limited to pan, tilt, zoom and focus, although it should be recognized that other parameters might also be used for the system 10. Also, hereinafter the encoder 38 is sometimes referred to as the PTZF encoder 38.

As illustrated in FIG. 4, the master control unit 24 may also include a target determination module 42 and a slave control module 43. The modules 42, 43 may be implemented as software code to be executed by the master control unit 24 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The target determination module 42 reads the current PTZF parameters received from the master camera system 14. Based on the pan/tilt angles, the target determination module 42 may compute the position of the desired target within the scene 12, and based on the zoom and focus parameters the target determination 42 may compute the size of the target at the position in images from the master camera system 14.

Based on the determined target position and size, the slave control module 43 may compute the desired pan, tilt, zoom and focus parameters for each slave camera system 16. As described further hereinbelow, this calculation may also be dependent on master/slave mapping data, which may be ascertained during a calibration process. The master/slave mapping data may be stored in a network database 50, as illustrated in FIG. 4. According to another embodiment, the master/slave mapping data may be stored in a memory unit (not shown) of the master control unit 24. Once computed by the slave control module 42, the parameters are communicated, via the network 28, to the slave camera control units 26 that control the slave camera systems 16. Commands may be sent from the master control unit 24 to each slave camera control unit 26 at a high update rate in order to be responsive to movements made by the operator of the master camera system 14.

Also, as illustrated in FIG. 4, each slave camera control unit 26 includes a servo control module 44. The servo control modules 44 may be implemented as software code to be executed by the slave camera control units 26 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Based on the PTZF parameters received from the slave control unit 43, the servo control modules 44 execute a servo control loop to compute commands to control the pan, tilt, zoom and focus of the slave camera systems 16 in order that the slave camera systems 16 may track the same target as the master camera system 14 and with the same focus to smoothly and accurately track the scene position designated by the master camera system 14. The PTZF commands for the slave camera systems 16 may be communicated from the slave camera control units 26 via, for example, the fiber optic cable 34 and RS-232 links. The pan and tilt commands may be input to the pan/tilt device 20 of the slave camera system 16 and the zoom/focus commands may be input to the camera 18 of the slave camera system 16.

Thus, according to one embodiment, based on feedback from the master camera system 14 and knowledge of the geometry of the scene, a 3D servo-fixation point may be chosen, which is the desired target of each camera system 14, 16. Each slave camera system 16 is then directed to view this fixation point. As the operator moves the master camera system 14 in real-time, each slave camera system 16 is controlled to continuously servo on the moving fixation point. The zoom and focus of each slave camera system 16 is also controlled, based on their distance to the desired servo-fixation point.

Also, as illustrated in FIGS. 3 and 4, the system 10 may include an image sequence generator 60 which may, according to one embodiment, be implemented by a computing device such as, for example, a personal computer, a laptop computer, a workstation, a minicomputer, a mainframe or a supercomputer, depending upon the application requirements. The image sequence generator 60 may include a video reviewer interface module 62 and a frame-sequencing module 64. The modules 62, 64 may be may be implemented as software code to be executed by a processor of the generator 60 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Video from the master and slave camera systems may be continuously stored in the video storage units 30. The video reviewer interface module 62 may be a graphic-based man-machine interface that provides continuous video from at least one of the camera systems 14, 16 to a video review operator and which allows the video review operator to, for example, select a point in time in which to create a 3D stop-motion video image sequence of the target or to, for example, select a beginning point in time for an image sequence that spans across a period of time. The video review operator may also, for example, select the camera systems for the beginning and end of the image sequence, which may be less than all of the camera systems. The reviewer interface module 62 may also allow the reviewer to retrieve video frames temporally (i.e., sequential frames in time from a single camera system) or spatially (i.e., the same time frame, retrieved from a sequence of cameras).

When the video review operator selects the parameters for the desired image sequence, the frame sequencing module 64 may retrieve the appropriate image frames from the video storage units 30 and output these images in sequence corresponding to the order of the placement of the camera systems 14, 16 around the scene 12. For example, to generate a 3D stop-motion image sequence, the frame-sequencing module 64 may retrieve the image from each camera system for a particular time t, and output the images in sequence corresponding to the position of the corresponding camera systems around the scene 12, either clockwise or counterclockwise. According to one embodiment, each camera system 14, 16 may be synchronized to a common genlock signal, so that the shutter for each camera 18 fires at precisely the same time, resulting in video frames taken at the same time instant, thus heightening the apparent stop-motion effect.

In addition, as described in more detail hereinafter, the frame-sequencing module 64 may allow the video reviewer (or any other person), such as via the video review interface 62, to select the point of interest (POI) for each image to be displayed by the frame-sequencing module 64. The frame-sequencing module 64 may shift the images, either horizontally or vertically, except a first image, in such a way that the POI in each image is in the same position as in the first image. This technique may be used, for example, to compensate for misalignment errors in the camera systems 14, 16 to thereby stabilize the video output.

Figure 5:
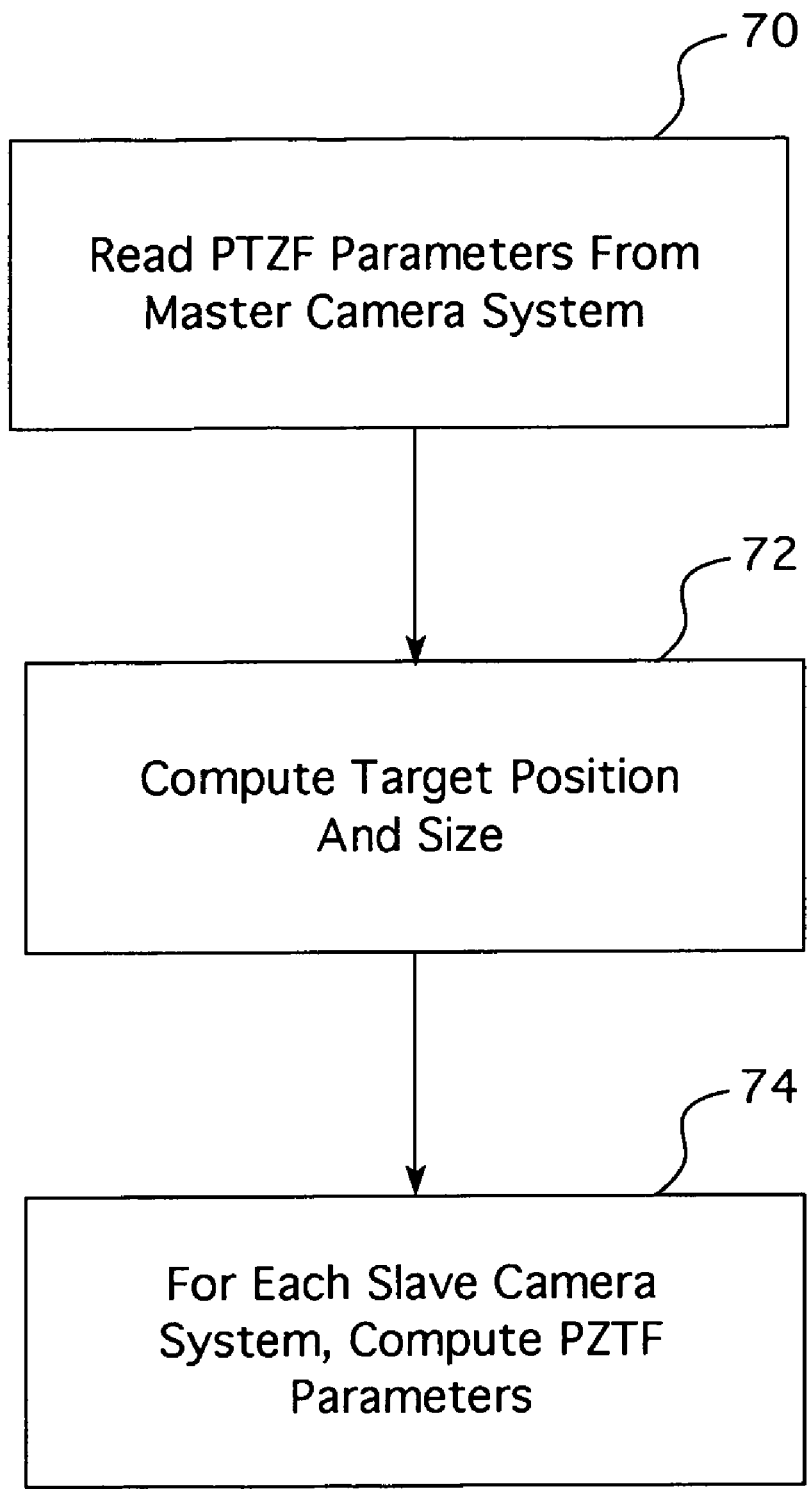
FIG. 5 is a diagram of the process flow through the master control unit of the system of FIGS. 3 and 4 according to one embodiment of the present invention.

FIG. 5 is a diagram illustrating the process flow through the master control unit 24 according to one embodiment of the present invention. The process initiates at block 70 where the master control unit 24 reads the pan, tilt, zoom and focus (PTZF) parameters of the master camera system 14. Next, at block 72, the target determination module 42 determines the position and size of the target. As described previously, the target determination module 42 may determine the position from the pan and tilt parameters and the size from the zoom and focus parameter. Next, at block 74, the slave control module 43 may compute the PTZF parameters for each of the slave camera systems 16 based on the determined target position and size, and based on the master/slave mapping data as determined in the calibration process.

Before operation of the system 10, each camera system 14, 16 maybe calibrated so that its relationship to the scene 12 and to the other camera systems is known. According to one embodiment, this requires determining the pose (i.e., location and orientation) of each camera system 14, 16 with respect to a scene coordinate system, determining the relationship of the zoom control parameter to angular field of view, and determining the relationship of the focus control parameter to the distance of objects in the scene.

Camera pose may be determined by measuring the pan/tilt angles toward a set of distinguished points or "landmarks" with known 3D coordinates. "Sighting" the landmarks involves rotating the pan/tilt device from a user interface, until the landmark point is centered within the field of view of the camera. The pan/tilt parameters are then stored with the X,Y,Z coordinates of the landmark to form one pose calibration measurement.

Camera orientation and location can be determined by an optimization procedure, using three or more landmark measurements in a nondegenerate configuration. For high-precision pointing, it may also be necessary to measure the pitch and yaw of the sensor as mounted on the pan/tilt devices 20, and the offset of the sensor focal point from the center of rotation of the pan/tilt device 20. These values can be measured directly and/or solved for using an optimization procedure based on more than three landmark measurements.

Computer control of motorized zoom lenses may involve sending commands to the camera system containing parameters specifying the desired zoom and focus. The effect of the value of these parameters on physical lens settings may be determined through calibration. The zoom parameter may be calibrated by stepping through the allowable values and measuring the field of view after the motorized zoom is complete. User control of the pan/tilt devices 20 can be used to actively and directly measure the field of view at each setting.

The focus parameter may be calibrated by focusing on objects at different distances from the camera systems 14, 16, and deriving either an explicit or implicit relationship between focus value and distance. For example, an implicit relationship can be determined using a lookup table of focus parameter settings, indexed by inverse distance to the desired focal distance in the scene. Focus to points at intermediate distances can be determined via interpolation of these stored table values.

During system operation, the operator may select any camera system in the system 10 to act as a master camera system 14. According to one embodiment, the operator may change which camera system is the master camera system 14 at any time.

Figure 6:
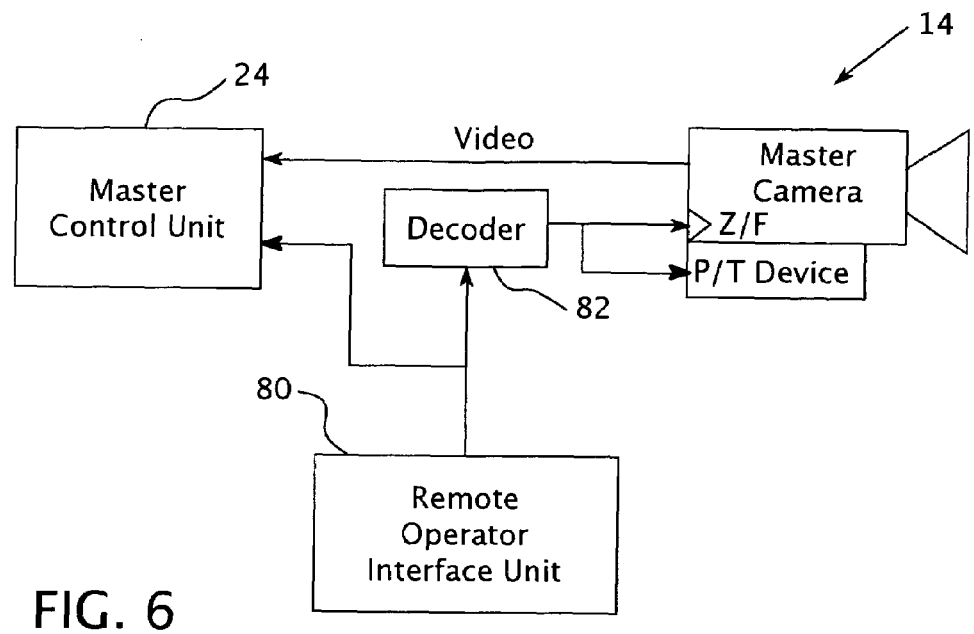
FIGS. 6 and 7 are diagrams of a portion of the system according to different embodiments.

For an embodiment in which the operator of the master camera system 14 is a human operator, i.e., a "cameraman," the cameraman may control the pan, tilt, zoom and focus of the master camera system 14 remotely through a remote operator interface unit 80, as illustrated in FIG. 6. The remote operator interface unit 80 may be implemented as a computing device such as, for example, a personal computer, a laptop computer or a workstation, providing a graphical user interface to allow the cameraman to specify the pan, tilt, zoom and focus parameter for the master camera system 14. A decoder 82 may decode these parameters for use by the master camera system 14. These parameters may also be input to the master control unit 24, either directly from the user interface, as illustrated in FIG. 6, or as feedback from the master camera system after it has executed a movement, as shown in FIG. 4.

Figure 7:
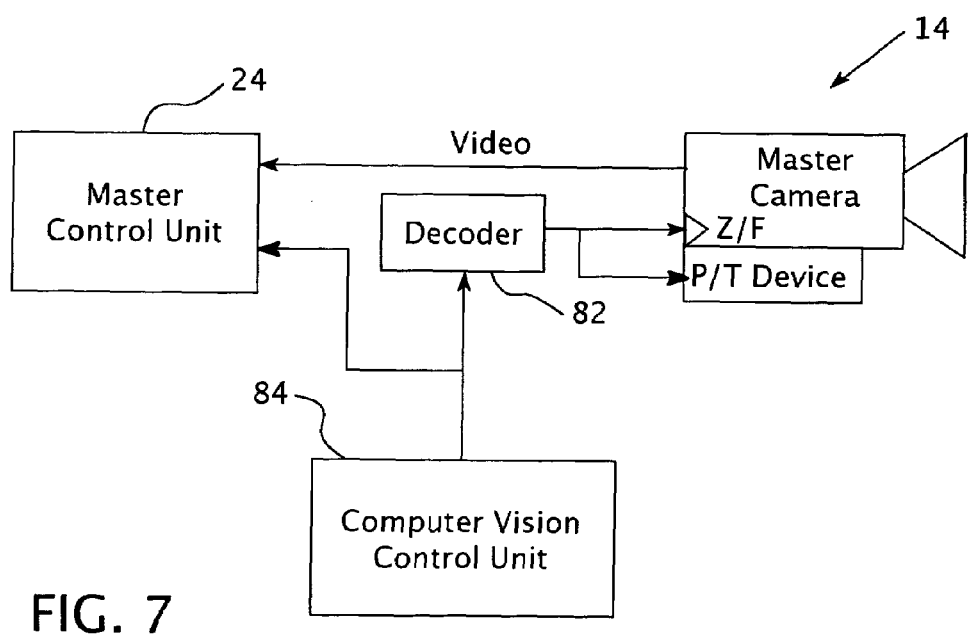

As described previously, the operator of the master camera system 14 may also be a computer vision application. FIG. 7 is a diagram of a portion of the system 10 according to such an embodiment. As illustrated in FIG. 7, the system 10 includes a computer vision control unit 84 for controlling the master camera system 14. The computer vision control unit 84 may be implemented as a computing device such as, for example, a personal computer, a laptop computer or a workstation, configured with computer vision software that when executed by the computer vision control unit automatically detects and tracks moving objects in the scene 12 by processing video from the master camera system 14. According to another embodiment, the computer vision control unit 84 may receive the video from and be in communication with each camera system 14, 16, and may automatically select a different camera system to be the master computer system to decrease the distance to, or increase the visibility of, an object being tracked by the computer vision control unit 84.

Figure 8:
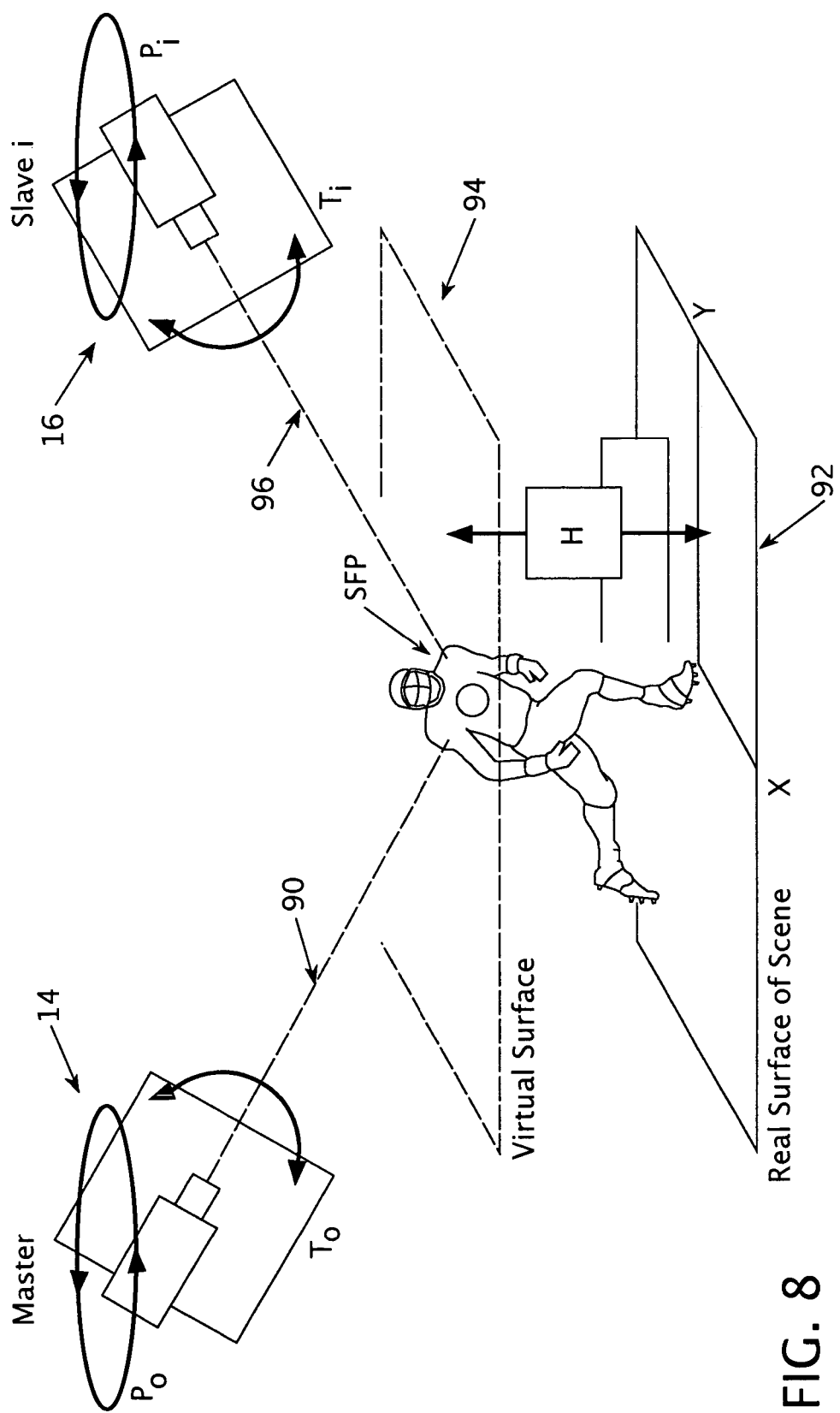
FIG. 8 is a diagram illustrating the relationship between the principal viewing ray of the master camera system and the servo fixation point (SFP) according to one embodiment.

With reference to FIG. 8, based on the pan/tilt angle parameters from the master camera system 14, the master control unit 24 may determine the equation of a 3D line specifying the principal-viewing ray 90 of the master camera system 14. All points on this line can be represented as $\vec{p} = \vec{c} + k\vec{v}$, where $\vec{p}$ is a 3D point on the line, $\vec{c}$ is the focal point of the master camera system, $\vec{v}$ is a unit vector representing the orientation of the principal axis, directed out from the focal point, and k is a scalar parameter that selects different points on the line. Only points on the line that are in front of the focal point (i.e., k>0) are considered to be on the master camera system principal viewing ray 90.

The desired servo-fixation point (SFP) for the spin-image effect is defined to be some point on the principal viewing ray 90 of the master camera system 14. Choosing which point is the SFP is equivalent to choosing a value for parameter k in the above line equation. The SFP may be determined by specifying k directly through a user interface such as, for example, the video reviewer interface 62 or the remote operator interface unit 80. Note that k represents the distance or range of the desired SFP from the master camera system 14. It may be selected using a one-degree of freedom mechanism, by the cameraman or a second operator. According to one embodiment, the SFP may be determined by intersecting the principal-viewing ray 90 with an equation or set of equations representing a real surface of the scene 92. For example, the real surface of the scene 92 may be approximately represented by the equation of a plane. Alternatively, a more accurate approximation may be to represent the field by a nonplanar, triangulated mesh, or an explicit nonplanar surface equation.

Similarly, the SFP may be determined by intersecting the principal-viewing ray 90 with an equation or set of equations representing a virtual (nonphysical) surface 94 in the scene. For example, it may be desirable to intersect the viewing ray 90 with a virtual surface 94 located a certain distance H, e.g. four feet, above the real surface of the scene 92. According to another embodiment, the SFP may be determined by intersecting the principal-viewing ray 90 with a set composed of any arbitrary combination real and virtual surfaces in the scene, for example the floor, walls and ceiling of a room.

If the SFP is determined by intersecting the principal-viewing ray 90 with a surface or set of surfaces. Because there is more than one mathematical intersection point, various methods may be used to determine which point is the desired SFP. One such method is to always choose the intersection point that is closest to the master camera system 14. If there is no mathematical intersection point, an alternate method must be used to determine the SFP. One example is to use the last known valid point of intersection.

For each slave camera system, the 3D position of the SFP is used to compute the pan and tilt angle parameters that bring the slave camera system principal-viewing ray 96 into alignment with the SFP. These values are used to command the pan/tilt device 20 of the respective slave camera systems 16 to move. After this movement, the SFP may appear in the center of the camera image.

The distance d between a slave camera system position $\vec{c}$ and SFP $\vec{x}$ may be computed. Let vector $(a,b,c) = \vec{x} - \vec{c}$. Then d may be computed as $d=\sqrt{a^2+b^2+c^2}$.

The zoom of each slave camera system 16 may be controlled to keep the object of interest (a person, for example) substantially the same size in all the images (such as within error margins caused by serving errors and misalignment), even though the slave camera systems 16 may be different distances away from the object. Let r be the desired radius of a virtual sphere subtending the entire vertical field of view of each image. Let $d_i$ be the distance from slave camera system $16_i$ to the SFP. Then the desired vertical field of view angle $\alpha_i$ can be computed as $\alpha_i = 2*\arctan(r/d_i)$. The zoom parameter that achieves this desired field of view is then computed by the servo control module $44_i$ from data collected during the prior zoom camera calibration procedure.

The focus of each slave camera system 16 may be controlled to achieve sharp focus at the SFP. The focus parameter that achieves sharp focus at distance $d_i$ may be computed for slave camera system $16_i$ using the distance versus focus parameters equations or tables derived from the prior focus camera calibration procedure.

According to another embodiment, in order to achieve smooth motion, each servo control module 44 of the slave camera control units 26 may have to command the pan/tilt device 20 of the slave camera systems 16 as well as the camera/lens systems thereof at an even higher rate than it is receiving commands from the slave control module 43 of the master control unit. This may be achieved by interpolating between the last-received command and the current command, thereby controlling the pan, tilt, zoom and focus in smaller increments, more frequently.

As mentioned previously, the frame-sequencing module 66 may allow an operator to select the point of interest (POI) in the sequence of images used to create the spin image effect to thereby stabilize the video output by correcting for misalignment errors. According to one embodiment, a method of stabilizing the image sequence may be implemented as follows.

Suppose images I1, I2, . . . Ii are taken by a set of camera systems i=1, 2, . . . N. For the sake of explanation, assume that the camera systems surround the object (or target) and look toward the object. Further assume that camera system i and camera system i+1 are at neighboring positions. The coordinate system for each image may be defined as $\vec{u}_i = (u_i, v_i)$.

In each image $I_i$, the point of interest (POI) may be defined as $\vec{c}_i = (uc_i, vc_i)$. According to one embodiment, the video reviewer interface 62 may allow the user to specify the POI for each image through a graphical user interface that allows the user to click the corresponding points with a mouse or stylus. According to another embodiment, the video reviewer interface 62 may allow the user to enter a character string corresponding to the coordinates for the POI.

Once the POI for each image has been selected, the frame-sequencing module 64 may perform a 2D projective transformation on the image coordinates of images $I_2$ through $I_N$ so that ci, i=2, . . . N, are moved to the same position as c1. This may be represented mathematically as:

$I_i \to I_{i'}$, by image coordinate transform: $\vec{u}_{i'} = \vec{u}_i - \vec{c}_i + \vec{c}_1$ for i=2, . . . N.

When the sequence of images, $I_1, I_{2'}, I_{3'}, \ldots I_{N'}$ is played as a time series, then the video rotation will appear to be stabilized. It should be noted that $I_1$ need not be the image from master camera system 14, but rather may be the image from any of the slave camera systems 16. In addition, for an application in which the images $I_1$-$I_N$ are not all from the same instant in time, image $I_1$ need not be the first image temporally.

Accordingly, given a set of images taken by the camera systems 14, 16 placed around the object (or a scene), the spin-image effect may be stabilized by selecting (manually, for example) the corresponding points, one from each image, and shifting the images horizontally and vertically in such a way that the corresponding points match the same point in the first image. As a result, the playback of the resultant images, i.e., the first original image and the corrected images for the second and following images, as a time sequence realizes an effect of fixated and smooth rotational motion around the object (or scene).

Figure 9:
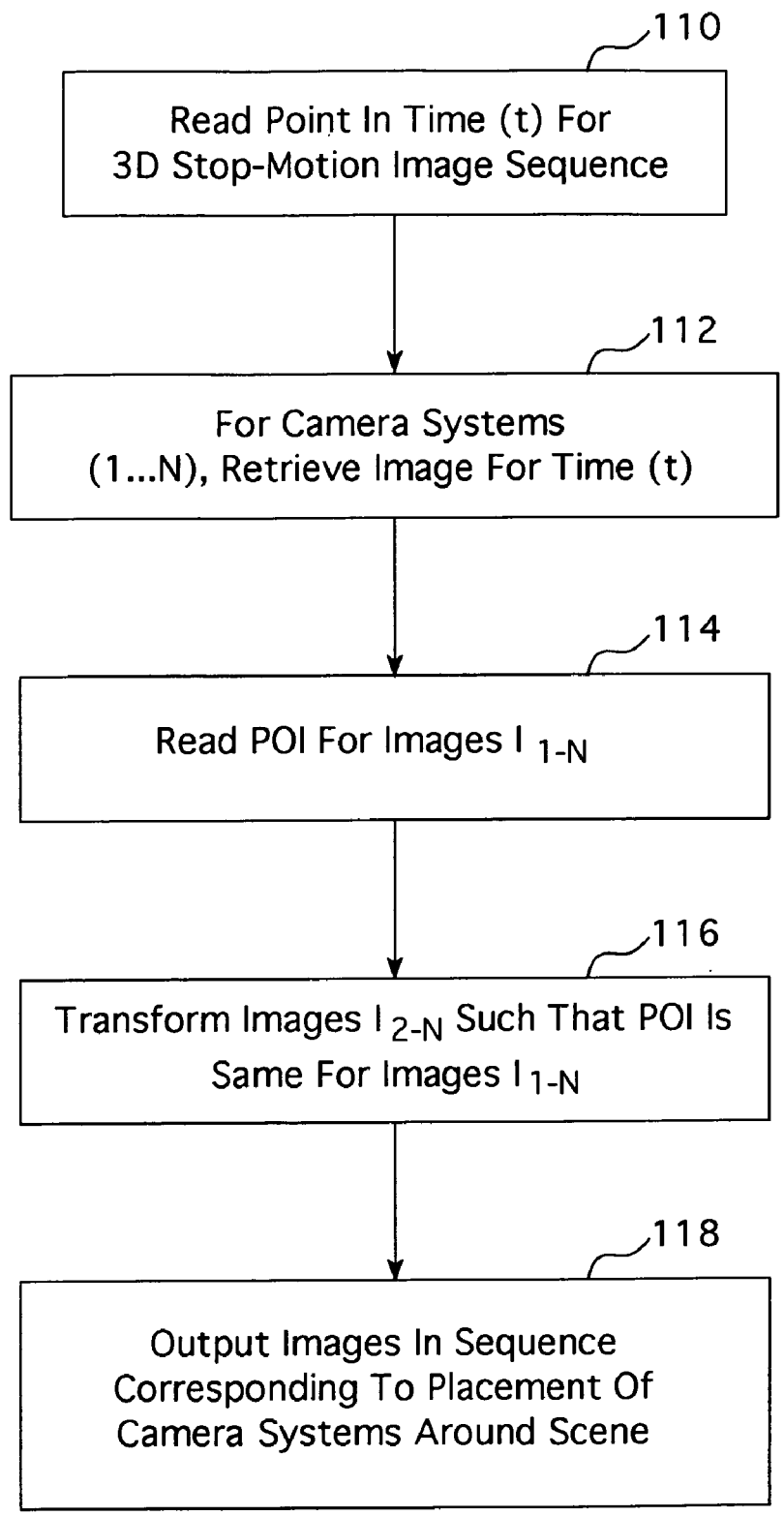
FIG. 9 is a diagram of the process flow through the 3D stop-motion image sequence generator of FIGS. 3 and 4 according to one embodiment of the present invention.

FIG. 9 is a diagram of the process flow through the image sequence generator 60 according to one embodiment of the present invention. For purposes of illustration, assume it is desired to generate a 3D stop-motion image sequence, wherein images from all the camera system 14, 16 at a particular time t are to be displayed in sequence according to placement of the corresponding camera systems around the scene 12. The process initiates at block 110, where the image sequence generator 60 reads the time (t) for which the 3D stop-motion image sequence is to be generated. As described previously, the video reviewer may specify this instant in time through the video reviewer interface module 62. Next, at block 112 the frame-sequencing module 64 may retrieve from the video storage units 30 the image (images $I_{1-N}$) for time t for certain (all or less than all) of the camera systems 14, 16.

At block 114, the image sequence generator 60 may read the POI for each image $I_{1-N}$. As described previously, an operator may enter the POI for each image $I_{1-N}$ through the video reviewer interface module 62 such as by, for example, clicking on the point in the image with a mouse or stylus. According to another embodiment, the operator may enter a character string corresponding to the coordinates of the POI for each image $I_{1-N}$ through the video reviewer interface module 62.

At block 116, the frame-sequencing module 64 may 2D projective transform the images $I_{2-N}$, horizontally and/or vertically, such that the POI for each transformed image $I_{1,2'-N'}$ is in the same position. Next, at block 118, the frame-sequencing module 64 may output these images in sequence corresponding to the order of the placement of the corresponding camera systems 14, 16 around the scene 12, either clockwise or counter-clockwise, to generate the 3D stop-motion video image sequence.

Although the present invention has been described herein with respect to certain embodiments, those of ordinary skill in the art will recognize that many modifications and variations of the present invention may be implemented. For example, rather than employing a distributed architecture, the master control unit 24 and the slave camera control units 26 may be integrated into one computer device. According to such an embodiment, the master control unit 24 may therefore further include the servo control module 44 for computing the PTZF commands for each slave camera system 16.

According to one embodiment, the image sequence generator 60 may be integrated with the computing device of the master control unit 24, as may the remote operator interface unit 80 or the computer vision control unit 84. According to another embodiment, the image sequence generator 60 may be distributed across more than one computing device. In addition, according to another embodiment, the slave control module 43 may be distributed among the slave camera control units 26. According to such an embodiment, the appropriate master/slave mapping data may be stored in memory units of the slave camera control units 26.

According to another embodiment, one may chose to make one of the slave camera systems 16 the master camera system. Accordingly, the original master camera system 14 would then be under the control of one of the slave camera control units 26. This may be realized, for example, by connecting each of the camera systems 14, 16 to a network such that each camera system 14, 16 is in communication with the master control unit and at least one slave camera control unit 26.

According to another embodiment, the system 10 may include a plurality of master camera systems 14, each one controlling a subset of slave camera systems 16. According to such an embodiment, the system 10 may include a plurality of master control units 24, one fore each master camera system 14. Each of the master control units may be centralized in one computing device.

The foregoing description and the following claims are intended to cover all such modifications and variations.

What is claimed is:

1. A method of generating an image sequence of an object within a scene, comprising:

capturing an image of the object with a plurality of networked variable pointing camera systems, wherein the camera systems are positioned around the scene, and wherein pointing and optical parameters from a first of the camera systems and mapping data for the camera systems are used to compute pointing and optical parameters for the remainder of the camera systems such that, at a point in time, the camera systems are aimed at the object and a size of the object in images from each of the camera systems is substantially the same;

2D projective transforming certain of the images captured by the camera systems such that a point of interest in each of the images is at a same position as a point of interest in a first image from one of the camera systems;

outputting the 2D projective transformed images and the first image in a sequence corresponding to a positioning of the corresponding camera systems around the scene; and determining the mapping data for the camera systems by;

determining the pose of each camera system with respect to the scene;

determining the relationship of a zoom control parameter to the angular field of view for each camera system; and determining the relationship of a focus control parameter to the distance to objects for each camera system.

2. The method of claim 1, wherein capturing the image of the object with the plurality of camera systems includes capturing the image of the object at the same instant in time with the plurality of camera systems.

3. The method of claim 2, further comprising receiving an input corresponding to the particular point in time.

4. The method of claim 1, further comprising, after capturing the images, receiving an input corresponding to the point of interest from a user via a user interface.

5. The method of claim 1, wherein capturing the images includes capturing an image with a plurality of pan/tilt camera systems positioned around the scene.

6. A system for generating an image sequence of an object within a scene, comprising:

a plurality of networked variable pointing camera systems positioned around the scene;

means for determining, based on pointing and optical parameters from a first of the variable pointing camera system and mapping data for the camera systems, pointing and optical parameters for the remainder of the variable pointing camera systems such that, at a point in time, the camera systems are aimed at the object and a size of the object in images from the camera systems is substantially the same;

means for controlling the remainder of the variable pointing camera systems based on the determined pointing and optical parameters for the remainder of the camera systems;

storage means for storing images captured by the plurality of camera systems; and a frame-sequencing module in communication with the storage means for 2D projective transforming stored images such that a point of interest in images from each of the plurality of camera systems is at the same position, wherein the mapping data includes:

data regarding the pose of each camera system with respect to the scene;

data regarding the relationship of a zoom control parameter to the angular field view for each camera system; and data regarding the relationship of a focus control parameter to the distance to objects for each camera system.

7. The system of claim 6, wherein the frame-sequencing module is further for outputting images from the plurality of camera systems in sequence corresponding to the positioning of the camera systems around the scene.

8. The system of claim 7, wherein the images from the camera systems are from the same point in time.

9. The system of claim 8, further comprising an interface module in communication with the frame-sequencing module for allowing an operator to specify the point in time.

10. The system of claim 7, further comprising an interface module for allowing the operator to specify the point of interest.

11. The system of claim 7, wherein the frame-sequencing module is for outputting the images from the plurality of camera systems in a clockwise sequence.

12. A system for generating an image sequence of an object within a scene, comprising:

a plurality of networked variable pointing camera systems positioned around the scene;

means, based on pointing and optical parameters from a first of the variable pointing camera system and mapping data for the camera system, for determining pointing and optical parameters for the remainder of the variable pointing camera systems such that, at a point in time, the camera systems are aimed at the object and a size of the object in images from the camera systems is substantially the same;

means for controlling the remainder of the variable pointing camera systems based on the determined pointing and optical parameters for the remainder of the camera systems;

storage means for storing images captured by the plurality of camera systems; and means in communication with the storage means, for 2D projective transforming the images from the plurality of camera systems such that a point of interest in images from each of the plurality of camera systems is at the same position, wherein the mapping data includes;

data regarding the pose of each camera system with respect to the scene;

data regarding the relationship of a zoom control parameter to the angular field view for each camera system; and data regarding the relationship of a focus control parameter to the distance to objects for each camera system.

13. The system of claim 12, further comprising means for outputting the images from the plurality of camera systems in sequence corresponding to the positioning of the camera systems around the scene.

14. The system of claim 13, wherein the images from the camera systems are from the same point in time.

15. The system of claim 14, further comprising means for allowing an operator to specify the point in time.

16. The system of claim 13, further comprising means for allowing the operator to specify the point of interest.

17. A system, comprising:

a plurality of pan/tilt camera systems positioned around a scene;

means for controlling the camera systems based on computed pointing and optical parameters for certain of the camera systems, wherein the pointing and optical parameters are computed based on pointing and optical parameters from at least one of the camera systems and based on mapping data for the camera systems, such that each camera system is aimed at a target within the scene and such that a size of the target in an image from each camera system is substantially the same at a particular time;

a video storage unit in communication with each pan/tilt camera system for storing images captured by each camera system; and a frame-sequencing module in communication with the video storage unit, wherein the frame-sequencing module is for 2D projective transforming images from certain of the camera systems such that a point of interest in an untransformed image from one of the camera systems is at a same position as a point of interest in each of the 2D projective transformed images, wherein the mapping data includes:

data regarding the pose of each camera system with respect to the scene;

data regarding the relationship of a zoom control parameter to the angular field view for each camera system; and data regarding the relationship of a focus control parameter to the distance to objects for each camera system.

18. The system of claim 17, wherein the frame-sequencing module is further for outputting the 2D projective transformed images and the untransformed image in sequence corresponding to the positioning of the corresponding camera systems around the scene.

19. The system of claim 17, further comprising an interface module for allowing an operator to specify the point of interest in the untransformed image and in the 2D projective transformed images.

* * * * *

UNITED STATES PATENT AND TRADEMARK OFFICE
CERTIFICATE OF CORRECTION

PATENT NO. : 7,102,666 B2
APPLICATION NO. : 10/074315
DATED : September 5, 2006
INVENTOR(S) : Kanade et al.

It is certified that error appears in the above-identified patent and that said Letters Patent is hereby corrected as shown below:

On Title Page, Item 56
OTHER PUBLICATIONS

PAGE 2

Line 9, delete "USA, vol. 4, No. 1: and substitute therefor --USA, Vol. 4, No. 1--.

On Title Page Item 56
PAGE 2

Line 16, delete "US, vol. RA-3" and substitute therefor --US, Vol. RA-3--.

COLUMN 5

Line 7, delete "64 may be may be implemented" and substitute therefor --64 may be implemented--.

COLUMN 8

Line 29, delete "by serving errors" and substitute therefor --by servoing errors--.

COLUMN 10

Line 45, delete "one fore each" and substitute therefor --one for each--.

Signed and Sealed this

Seventeenth Day of April, 2007

JON W. DUDAS
*Director of the United States Patent and Trademark Office*